Patented Dec. 15, 1953

2,662,870

UNITED STATES PATENT OFFICE 2,662,870

REACTION PRODUCTS OF POLYEPOXIDES WITH STYRENE-ACRYLIC ACID-VINYL PYRIDINE COPOLYMERS

Owen Clement Wentworth Allenby, McMasterville, Quebec, Canada, assignor to Canadian Industries Limited, Montreal, Quebec, Canada, a corporation of Canada No Drawing. Application June 21, 1952,
Serial No. 294,922

10 Claims. (Cl. 260—45.5)

1

This invention relates to new polymeric materials and to a method of making the same. More particularly, it relates to thermoset, infusible, solvent insoluble polymers of styrene having an intermediate thermoplastic, fusible, solvent soluble stage, and to a method of making the same. Still more particularly, it relates to such polymers for use in the protective coating field.

This application is a continuation-in-part of my copending United States application Serial No. 277,543, filed on March 19, 1952, now abandoned.

In United States application Serial No. 229,291, filed on May 31, 1951, in the names of G. H. Segall and J. F. C. Dixon, now United States Patent No. 2,604,464, dated July 22, 1952, there are described and claimed new thermoset, infusible, solvent insoluble polymers of styrene having an intermediate thermoplastic, fusible, solvent soluble stage. These polymers are prepared by copolymerizing more than 50 parts of styrene with at least 5 parts of an acid selected from the group consisting of acrylic acid and methacrylic acid, with or without another monoethylenically unsaturated compound having the ethylenic group as sole reactive group, the total parts being 100, and subsequently heating the resultant thermoplastic, fusible, solvent soluble copolymers with one mol of diphenylolpropane diglycidyl ether for each two free carboxylic acid groups of the copolymers at a temperature of about 150° C. in the presence of at least 0.5%, by weight of the copolymers, of an organic basic catalyst, the most effective catalyst being trimethylbenzylammonium acetate. It is also disclosed in said application that by incorporating at least 15 parts of a lower alkyl ester of acrylic acid in the styrene/acrylic acid copolymers, these copolymers yield upon heating with diphenylolpropane diglycidyl ether under the aforementioned conditions protective coatings which are markedly superior to other known protective coatings based on thermoset, infusible, solvent insoluble polymers. Despite their very useful properties, however, these thermoset polymers are objectionable, particularly when used as protective coatings, in that they have a strong disagreeable odour due to the presence therein of trimethylbenzylammonium acetate.

It has now been found that if vinyl pyridine is incorporated into the thermoplastic styrene copolymers when the latter are formed, i. e. by copolymerization with the styrene, acrylic acid and other monomeric constituent of these copolymers, the above difficulty is completely overcome.

2

Because of its basic character, vinyl pyridine acts as a catalyst for the infusibilization and insolubilization of the thermoplastic copolymers and hence there is no need for separate addition of an organic basic catalyst such as trimethylbenzylammonium acetate prior to heating of the copolymers with diphenylolpropane diglycidyl ether. Furthermore, in view of the fact that vinyl pyridine is an integral part of the polymer chain, no problem arises with the volatility of the catalyst under the heating conditions and hence vinyl pyridine can be used in a lesser amount than previously used organic basic catalysts such as trimethylbenzylammonium acetate. It has also been found that the incorporation of vinyl pyridine into the thermoplastic styrene copolymers themselves not only improves the odour of these copolymers when converted into their thermoset form but also improves their outdoor clour retention.

It has also been found that when vinyl pyridine is incorporated into the thermoplastic styrene copolymers in the aforementioned manner, it is possible to replace diphenylolpropane diglycidyl ether by low molecular weight polymeric condensation products of diphenylolpropane with epichlorohydrin and obtain, upon heating of the copolymers with these condensation products, thermoset polymers which are not only comparable to those obtained by use of diphenylolpropane diglycidyl ether from the standpoint of physical and chemical properties but are also superior thereto from the standpoint of manufacturing cost.

It is therefore an object of this invention to provide new and useful polymeric materials.

Another object of this invention is to provide styrene polymers having improved properties.

A further object of this invention is to provide new thermoset, infusible, solvent insoluble polymers of styrene having an intermediate thermoplastic, fusible, solvent soluble stage.

A still further object of this invention is to provide such styrene polymers for use in the protective coating field.

An additional object of this invention is to provide a method for preparing these polymers.

Additional objects of the invention will become apparent hereinafter.

These objects are accomplished by copolymerizing at least 0.05 part of vinyl pyridine with 100 parts of a monomeric mixture comprising essentially more than 50 parts of styrene and at least 5 parts of an acid selected from the group consisting of acrylic acid and methacrylic acid, and subsequently heating the resultant thermoplastic, fusible, solvent soluble copolymer at a temperature of from 100° to 150° C. with a polyepoxide selected from the group consisting of diphenylolpropane diglycidyl ether and low molecular weight polymeric condensation products of diphenylolpropane with epichlorohydrin, said condensation products having an epoxide

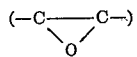

content of at least 7.5% by weight and a melting point not exceeding 75° C. and a Gardner viscosity not exceeding 1.65 poises as 40% solutions in ethylene glycol monobutyl ether, the proportion of polyepoxide to copolymer being such that one epoxide group is present for each free carboxylic acid group of the copolymer.

By copolymerizing at least 0.05 part of vinyl pyridine with 100 parts of a monomeric mixture comprising more than 50 parts of styrene, at least 5 parts of an acid selected from the group consisting of acrylic acid and methacrylic acid and at least 15 parts of a lower alkyl ester of acrylic acid, and subsequently heating the resultant thermoplastic copolymer at a temperature of from 100° to 150° C. with the aforementioned polyepoxide, protective coatings are obtained which are superior to the protective coatings obtained by the process disclosed in United States application Serial No. 229,291, now United States Patent No. 2,604,464, above referred to, with respect to odour and outdoor colour retention.

The details and manner of practising the invention will be apparent by reference to the following specific examples, it being understood that these examples are merely illustrative embodiments of the invention and that the scope of the invention is not limited thereto.

EXAMPLE I 72 parts of styrene, 8 parts of acrylic acid, 20 parts of methyl acrylate and 1 part of vinyl pyridine were dissolved in 100 parts of xylene and heated for 24 hours on a steam bath in the presence of 2 parts of benzoyl peroxide. 42 parts of the resultant thermoplastic copolymer solution were then thoroughly mixed with 7 parts of diphenylolpropane diglycidyl ether and 28 parts of titanium dioxide pigment, applied to a rigid steel surface and baked thereon for 45 minutes at 150° C. There was thus produced a high gloss white odourless coating having an excellent impact flexibility and durability as well as an excellent water, grease and acetone resistance, the acetone being a solvent for the initial thermoplastic copolymer. The water, grease and solvent resistance of the coating was superior to that of the alkyd-type coatings.

A similar coating containing no vinyl pyridine but an equivalent amount of trimethylbenzylammonium acetate incorporated with the diphenylolpropane diglycidyl ether, showed the same flexibility, durability, water, grease and acetone resistance, but had a strong unpleasant odour associated therewith.

EXAMPLE II

A thermoplastic copolymer of styrene, acrylic acid, methyl acrylate and vinyl pyridine was prepared by heating for 30 hours on a steam bath a solution of 72 parts of styrene, 8 parts of acrylic acid, 20 parts of methyl acrylate and 0.2 part of vinyl pyridine in 100 parts of xylene, in the presence of 2 parts of benzoyl peroxide. After mixing 42 parts of this copolymer solution with 7 parts of diphenylolpropane diglycidyl ether and 28 parts of titanium dioxide pigment, applying the mixture to a rigid steel surface and baking it for 45 minutes at 150° C., a coating was obtained which was similar in all respects to the coating obtained in Example I.

EXAMPLE III 72 parts of styrene, 8 parts of acrylic acid, 20 parts of methyl acrylate and 0.2 part of vinyl pyridine were dissolved in 50 parts of xylene and refluxed for 5 hours in the presence of 1 part of benzoyl peroxide and 1 part of t-butyl hydroperoxide. At the end of this time 20 parts of xylene were added, the small amount of unreacted monomers distilled off, and the total non-volatile material in the solution adjusted to 50% by the addition of further xylene. 60 parts of the resultant thermoplastic copolymer solution were then mixed with 3.5 parts of diphenylolpropane diglycidyl ether and 25 parts of titanium dioxide pigment, applied to a rigid steel surface and baked thereon for 1 hour at 150° C. There resulted a coating having the same properties as the coating produced in Example I.

EXAMPLE IV

Coatings were obtained having the same properties as the coating obtained in Example I by repeating the experiment of Example II but using 0.1 part and 0.79 part of vinyl pyridine instead of 0.2 part thereof.

EXAMPLE V 72 parts of styrene, 20 parts of methyl acrylate, 8 parts of acrylic acid, 0.05 part of vinyl pyridine, 1 part of benzoyl peroxide and 1 part of t-butyl hydroperoxide were dissolved in 100 parts of xylene and kept at reflux temperature for 4 hours. 200 parts of the resultant thermoplastic copolymer solution were then mixed with 15 parts of diphenylolpropane diglycidyl ether, applied as a film to a steel panel and baked thereon for 1 hour at 150° C. The resultant baked film was similar in all respects to that of Example I.

EXAMPLE VI

By applying the procedure of Example I to 72 parts of styrene, 8 parts of acrylic acid, 20 parts of methyl acrylate and 0.025 part of vinyl pyridine, an odourless coating was obtained but this coating had a poor adhesion and impact flexibility as well as poor acetone resistance, which indicated incomplete cross-linking.

EXAMPLE VII 52 parts of styrene, 40 parts of ethyl acrylate, 8 parts of acrylic acid, 0.2 part of vinyl pyridine, 1 part of benzoyl peroxide and 1 part of t-butyl hydroperoxide were heated at reflux temperature for 4 hours in 100 parts of xylene. To 200 parts of the resultant thermoplastic copolymer solution, there were added 15 parts of diphenylolpropane diglycidyl ether and a film was cast from the mixture on a steel panel. After heating at 150° C. for 1 hour, this film was insoluble in acetone.

EXAMPLE VIII

An acetone-insoluble film was obtained by applying the procedure of Example VII to 95 parts of styrene, 5 parts of methacrylic acid, 0.2 part of vinyl pyridine, 1 part of benzoyl peroxide and 1 part of t-butyl hydroperoxide.

EXAMPLE IX

To 25 parts of a 50% xylene solution of a thermo-plastic copolymer containing 72 parts of styrene, 8 parts of acrylic acid, 20 parts of methyl acrylate and 0.2 part of vinyl pyridine prepared as in Example II, there were added 10 parts of a 50% methyl ethyl ketone solution of a polymeric diphenylolpropane/epichlorohydrin condensation product prepared by heating diphenylolpropane with epichlorohydrin in the presence of caustic soda, said condensation product having an epoxide content of 7.5–8.5% by weight and a melting point of 65°–75° C. and a Gardner viscosity of 0.85–1.65 poises as a 40% solution in ethylene glycol monobutyl ether. A film was then drawn from this mixture on a glass panel, air dried for 20 minutes and baked for 50 minutes at 150° C. The baked odourless film thus obtained had an excellent impact flexibility and durability as well as an excellent water, grease and acetone resistance, the acetone being a solvent for the initial thermoplastic copolymer. The water, grease and solvent resistance of the film was superior to that of films prepared from alkyd-type resins.

No useful film could be obtained under the same conditions but using polymeric diphenylolpropane/epichlorohydrin condensation products having a lower epoxide content, e. g. 3.5–4.0%, a higher melting point, e. g. 95°–105° C., and a higher Gardner viscosity, e. g. 4.7–5.5 poise.

EXAMPLE X

To 45 parts of a solution comprising 27.1 parts of a copolymer containing 72 parts of styrene and 8 parts of acrylic acid and 20 parts of methyl acrylate and 0.2 part of vinyl pyridine, 27.1 parts of xylene, 17.3 parts of toluene and 25 parts of rutile titanium dioxide pigment, there were added 5 parts of the 50% methyl ethyl ketone solution of diphenylolpropane/epichlorohydrin condensation product described in Example IX. The resultant enamel was then sprayed on aluminum, steel and "bonderized" steel panels and these panels subsequently heated for 45 minutes at 150° C. There were thus produced high gloss white odourless coatings having the same properties as the film produced in Example IX.

EXAMPLE XI

To 5 parts of a 52% xylene solution of the thermoplastic copolymer described in Example IX, there was added 0.5 part of a 50% methyl ethyl ketone solution of a polymeric diphenylolpropane/epichlorohydrin condensation product having an epoxide content of 11–13% by weight and a Gardner viscosity of less than 0.5 poise as a 40% solution in ethylene glycol monobutyl ether. A film was drawn from the mixture on a glass panel and baked for 45 minutes at 150° C. The baked film was in all respects similar to that produced in Example IX.

EXAMPLE XII

To 52 parts of the pigmented copolymer solution of Example X, there were added 5 parts of the 50% methyl ethyl ketone solution of diphenylolpropane/epichlorohydrin condensation product described in Example XI, and films were sprayed therefrom on aluminum, steel and "bonderized" steel panels. After heating the panels at 150° C. for 45 minutes, coatings were obtained which were in all respects comparable to those obtained in Example X.

The above-detailed examples illustrate certain embodiments of the invention wherein there are completely infusibilized and insolubilized specific styrene/vinyl pyridine copolymers containing acrylic or methacrylic acid, with or without another polymerizable monoethylenically unsaturated compound having the ethylenic group as sole reactive group such as ethyl acrylate. The present invention, however, is not restricted to such specific unsaturated compounds as ethyl acrylate.

The monoethylenically unsaturated compounds which can be copolymerized with the styrene, vinyl pyridine and acrylic acids include any such compounds provided only that they are polymerizable and contain the ethylenic group as sole reactive group. Illustrative compounds which can be used are acrylic, haloacrylic, methacrylic esters and nitriles, such as, for example, acrylonitrile, methyl methacrylate, butyl methacrylate, octyl methacrylate, methoxymethyl methacrylate, and the corresponding esters of acrylic acid and alpha-chloroacrylic acid; vinyl and vinylidene halides, e. g. vinyl chloride, vinyl fluoride, vinylidene chloride, vinylidene fluoride; vinyl carboxylates, e. g. vinyl acetate, vinyl chloroacetate, vinyl propionate and vinyl stearate; vinyl aryls, e. g. vinyl naphthalene; methyl vinyl ketone, etc.

The lower alkyl esters of acrylic acid which are necessary for obtaining the above-mentioned superior protective coatings include such esters as methyl acrylate, ethyl acrylate, propyl acrylate and butyl acrylate.

For the preparation of the thermoplastic, fusible, solvent soluble styrene copolymers, any of the well-known processes for the copolymerization of styrene can be used.

As illustrated by the foregoing examples, 0.05 part of vinyl pyridine per 100 parts of the other polymerizable monomers is about the minimum required to produce complete cross-linking, i. e. infusibilization and insolubilization of the thermoplastic copolymers upon heating with diphenylolpropane diglycidyl ether or the polymeric diphenylolpropane/epichlorohydrin condensation products. An increase in the amount of vinyl pyridine lowers the heating temperature and shortens the heating time necessary for the conversion of the thermoplastic copolymers into their thermoset form but does not otherwise improve the properties of the thermoset polymers. Furthermore, it has been found that when the thermoplastic copolymers are mixed with diphenylolpropane diglycidyl ether or the diphenylolpropane/epichlorohydrin condensation products but the mixture is not baked immediately thereafter, use of more than 0.2 part of vinyl pyridine causes such an increase in the viscosity of the mixture that it is unsuitable for use after a few months. This is particularly objectionable when the mixture is for use as protective coatings and is sold in closed containers a long time before it will be used. However, if the diphenylolpropane diglycidyl ether or diphenylolpropane/epichlorohydrin condensation products are mixed with the thermoplastic copolymers immediately prior to the baking operation, vinyl pyridine can be incorporated into the thermoplastic copolymers in amounts greater than 0.2% by weight.

In the foregoing examples, titanium dioxide was used as the pigment constituent of the enamel coatings. Other pigments may also be used either alone or in admixture to produce enamels of various colours. These enamels are, however, of particular value when produced with white pigments since they are highly resistant to yellowing on baking. As previously mentioned, it has been found that the outdoor colour retention of the coatings of this invention is better than that of the coatings obtained in United States application Serial No. 229,291, now United States Patent No. 2,604,464, and containing no vinyl pyridine.

As previously mentioned, the polymeric diphenylolpropane / epichlorohydrin condensation products used must be of low molecular weight and hence of low viscosity and melting point and high epoxide content. When diphenylolpropane is condensed with epichlorohydrin the following molecular units are formed:

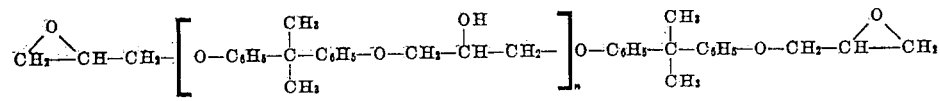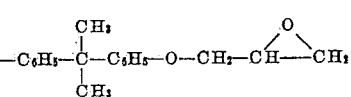

The formation of low molecular weight condensation products means formation of a plurality of short molecular units whereas high molecular weight condensation products involve molecular units of infinite length. Accordingly, low molecular weight condensation products possess a greater number of free epoxide groups which are available for cross-linking the styrene copolymers through the free carboxylic acid groups thereof. Low molecular weight condensation products also have a lower melting point and a lower viscosity and hence are readily miscible with the styrene copolymers. For the purpose of this invention, the condensation products must have a low molecular weight such as to possess at least 7.5% by weight of free epoxide groups, a melting point not exceeding 75° C. and a Gardner viscosity not exceeding 1.65 poise as 40% solutions in ethylene glycol monobutyl ether.

This invention provides a simple and easily-controlled process for obtaining thermoset, infusible, solvent insoluble polymers of styrene having an intermediate thermoplastic, fusible, solvent soluble stage. The process does not give rise to any objectionable odour or to the formation of any undesirable by-product.

The thermoset, infusible, solvent insoluble styrene polymers of this invention are adapted for a wide variety of uses. For examples, they are suitable as adhesives, laminates, protective coatings and for the production of moulded plastic articles and like outlets having a high chemical inertness. Plasticizers, pigments, dyes, reinforcing agents and like materials commonly used in formulating polymeric compositions can be used.

As above mentioned, some of the thermoset polymers of this invention yield protective coatings having physical and chemical properties hitherto unknown in protective coatings based on thermoset polymeric materials.

Since it is obvious that many changes and modifications can be made in the above-described details without departing from the nature and spirit of the invention, it is to be understood that the invention is not to be limited thereto except as set forth in the appended claims.

Having thus described my invention what I claim is:

1. A process for the preparation of a thermoset, infusible, solvent insoluble polymer of styrene, which comprises heating a thermoplastic, fusible, solvent soluble copolymer of from 0.05 to 1.0 part of vinyl pyridine and 100 parts of a mixture comprising essentially more than 50 parts of styrene and at least 5 parts of an acid selected from the group consisting of acrylic acid and methacrylic acid, at a temperature of from 100° to 150° C. with a polyepoxide selected from the group consisting of diphenylolpropane diglycidyl ether and low molecular weight polymeric condensation products of diphenylolpropane with epichlorohydrin, said condensation products having an epoxide content of at least 7.5% by weight and a melting point not exceeding 75° C. and a Gardner viscosity not exceeding 1.65 poises as 40% solutions in ethylene glycol monobutyl ether, the proportion of polyepoxide to copolymer being such that one epoxide group is present for each free carboxylic acid group of the copolymer.

2. A process for the preparation of a thermoset, infusible, solvent insoluble polymer of styrene suitable as protective coating, which comprises heating a thermoplastic, fusible, solvent soluble copolymer of from 0.05 to 1.0 part of vinyl pyridine and 100 parts of a mixture comprising more than 50 parts of styrene and at least 5 parts of an acid selected from the group consisting of acrylic acid and methacrylic acid and at least 15 parts of a lower alkyl ester of acrylic acid, at a temperature of from 100° to 150° C. with a polyepoxide selected from the group consisting of diphenylolpropane diglycidyl ether and low molecular weight polymeric condensation products of diphenylolpropane with epichlorohydrin, said condensation products having an epoxide content of at least 7.5% by weight and a melting point not exceeding 75° C. and a Gardner viscosity not exceeding 1.65 poises as 40% solutions in ethylene glycol monobutyl ether, the proportion of polyepoxide to copolymer being such that one epoxide group is present for each free carboxylic acid group of the copolymer.

3. A process for the preparation of a thermoset, infusible, solvent insoluble polymer of styrene suitable as protective coating, which comprises heating a thermoplastic, fusible, solvent soluble copolymer of 0.1–0.2 part of vinyl pyridine and 100 parts of a mixture comprising more than 50 parts of styrene and at least 5 parts of an acid selected from the group consisting of acrylic acid and methacrylic acid and at least 15 parts of a lower alkyl ester of acrylic acid, at a temperature of about 150° C. with a polyepoxide selected from the group consisting of diphenylolpropane diglycidyl ether and low molecular weight polymeric condensation products of diphenylolpropane with epichlorohydrin, said condensation products having an epoxide content of at least 7.5% by weight and a melting point not exceeding 75° C. and a Gardner viscosity not exceeding 1.65 poises as 40% solutions in ethylene glycol monobutyl ether, the proportion of polyepoxide to copolymer being such that one epoxide group is present for each free carboxylic acid group of the copolymer.

4. A process for the preparation of a thermoset, infusible, solvent insoluble polymer of styrene suitable as protective coating, which comprises heating a thermoplastic, fusible, solvent soluble copolymer of 0.1–0.2 part of vinyl pyridine, 72 parts of styrene, 8 parts of acrylic acid and 20 parts of methyl acrylate, at a temperature of about 150° C. with a polyepoxide selected from the group consisting of diphenylolpropane diglycidyl ether and low molecular weight polymeric condensation products of diphenylolpropane with epichlorohydrin, said condensation products having an epoxide content of at least 7.5% by weight and a melting point not exceeding 75° C. and a Gardner viscosity not exceeding 1.65 poises as 40% solutions in ethylene glycol monobutyl ether, the proportion of polyepoxide to copolymer being such that one epoxide group is present for each free carboxylic acid group of the copolymer.

5. A thermoset, infusible, solvent insoluble polymer of styrene as prepared by the process set forth in claim 1.

6. A thermoset, infusible, solvent insoluble polymer of styrene as prepared by the process set forth in claim 2.

7. A thermoset, infusible, solvent insoluble polymer of styrene as prepared by the process set forth in claim 4.

8. A coating composition adapted for being hardened into an infusible, solvent insoluble, grease-resistant film on baking at a temperature of from 100° to 150° C. after application, comprising essentially a linear thermoplastic copolymer of from 0.05 to 1.0 part of vinyl pyridine and 100 parts of a mixture comprising more than 50 parts of styrene and at least 5 parts of an acid selected from the group consisting of acrylic acid and methacrylic acid and at least 15 parts of a lower alkyl ester of acrylic acid, in admixture with a polyepoxide selected from the group consisting of diphenylolpropane diglycidyl ether and low molecular weight polymeric condensation products of diphenylolpropane with epichlorohydrin, said condensation products having an epoxide content of at least 7.5% by weight and a melting point not exceeding 75° C. and a Gardner viscosity not exceeding 1.65 poises as 40% solutions in ethylene glycol monobutyl ether, the proportion of polyepoxide to copolymer being such that one epoxide group is present for each free carboxylic acid group of the copolymer.

9. A coating composition adapted for being hardened into an infusible, solvent insoluble, grease-resistant film on baking at a temperature of about 150° C. after application, comprising essentially a linear thermoplastic copolymer of 0.1–0.2 part of vinyl pyridine and 100 parts of a mixture comprising more than 50 parts of styrene and at least 5 parts of an acid selected from the group consisting of acrylic acid and methacrylic acid and at least 15 parts of a lower alkyl ester of acrylic acid, in admixture with a polyepoxide selected from the group consisting of diphenylolpropane diglycidyl ether and low molecular weight polymeric condensation products of diphenylolpropane with epichlorohydrin, said condensation products having an epoxide content of at least 7.5% by weight and a melting point not exceeding 75° C. and a Gardner viscosity not exceeding 1.65 poises as 40% solutions in ethylene glycol monobutyl ether, the proportion of polyepoxide to copolymer being such that one epoxide group is present for each free carboxylic acid group of the copolymer.

10. A coating composition adapted for being hardened into an infusible, solvent insoluble, grease-resistant film on baking at a temperature of about 150° C. after application, comprising essentially a linear thermoplastic copolymer of 0.1–0.2 part of vinyl pyridine, 72 parts of styrene, 8 parts of acrylic acid and 20 parts of methyl acrylate, in admixture with a polyepoxide selected from the group consisting of diphenylolpropane diglycidyl ether and low molecular weight polymeric condensation products of diphenylolpropane with epichlorohydrin, said condensation products having an epoxide content of at least 7.5% by weight and a melting point not exceeding 75° C. and a Gardner viscosity not exceeding 1.65 poises as 40% solutions in ethylene glycol monobutyl ether, the proportion of polyepoxide to copolymer being such that one epoxide group is present for each free carboxylic acid group of the copolymer.

OWEN CLEMENT WENTWORTH ALLENBY.

References Cited in the file of this patent

UNITED STATES PATENTS

| Number | Name | Date |
|---|---|---|
| 2,604,464 | Segall et al. | July 22, 1952 |